(12) United States Patent
Ke et al.

(10) Patent No.: US 12,326,882 B2
(45) Date of Patent: Jun. 10, 2025

(54) GREEN KNOWLEDGE RECOMMENDATION METHOD BASED ON CHARACTERISTIC SIMILARITY AND USER DEMANDS, ELECTRONIC DEVICE AND COMPUTER READABLE STORAGE MEDIUM THEREOF

(71) Applicant: HEFEI UNIVERSITY OF TECHNOLOGY, Hefei (CN)

(72) Inventors: Qingdi Ke, Hefei (CN); Zhen Zhang, Hefei (CN); Zisheng Li, Hefei (CN); Lei Zhang, Hefei (CN)

(73) Assignee: HEFEI UNIVERSITY OF TECHNOLOGY, Hefei (CN)

( * ) Notice: Subject to any disclaimer, the term of this patent is extended or adjusted under 35 U.S.C. 154(b) by 0 days.

(21) Appl. No.: 18/964,413

(22) Filed: Nov. 30, 2024

(65) Prior Publication Data
US 2025/0094451 A1   Mar. 20, 2025

Related U.S. Application Data

(63) Continuation of application No. PCT/CN2023/118564, filed on Sep. 13, 2023.

(30) Foreign Application Priority Data

Feb. 13, 2023 (CN) .............. 202310103329

(51) Int. Cl.
*G06F 16/28* (2019.01)
*G06F 16/21* (2019.01)
(Continued)

(52) U.S. Cl.
CPC .......... *G06F 16/285* (2019.01); *G06F 16/213* (2019.01); *G06F 16/2457* (2019.01); *G06N 5/022* (2013.01); *G06F 40/30* (2020.01)

(58) Field of Classification Search
CPC .. G06F 16/285; G06F 16/213; G06F 16/2457; G06F 40/30; G06F 40/216;
(Continued)

(56) References Cited

U.S. PATENT DOCUMENTS

| 2015/0095331 | A1* | 4/2015 | He | G06Q 10/06 |
| | | | | 707/736 |
| 2015/0262078 | A1* | 9/2015 | Sarikaya | G06N 20/00 |
| | | | | 706/12 |

(Continued)

OTHER PUBLICATIONS

Kim et al., Article: "TopicSifter: Interactive Search Space Reduction through Targeted Topic Modeling," 2019 IEEE Conference on Visual Analytics Science and Technology (VAST), Vancouver, BC, Canada, 2019, pp. 35-45, doi: 10.1109/VAST47406.2019.8986922 (Year: 2019).*

(Continued)

*Primary Examiner* — Evan Aspinwall
(74) *Attorney, Agent, or Firm* — Hemisphere Law, PLLC; Zhigang Ma

(57) ABSTRACT

The present invention discloses a green knowledge recommendation method based on characteristic similarity and user demands, an electronic device and a computer readable storage medium thereof. The method includes: obtaining a current-search text e and a historical-search-texts set $E_u$ both from a user; constructing a topics dictionary and a subtopics dictionary according to a green knowledge base, and decomposing the e and the $E_u$ on the basis of semantic decomposition; picking words in a text-vector set and a valid-text set that about two dictionaries; finding the corresponding knowledge according to user satisfaction. The invention enables users to quickly find the required content through templating, thus avoiding users' meaningless search, improving search efficiency, and reducing the loss of useless time.

3 Claims, 1 Drawing Sheet

(51) Int. Cl.
  *G06F 16/2457* (2019.01)
  *G06F 40/30* (2020.01)
  *G06N 5/022* (2023.01)
(58) Field of Classification Search
  CPC ...... G06F 16/367; G06F 16/35; G06F 40/242; G06F 40/211; G06F 16/374; G06F 16/3344; G06F 40/58; G06F 40/56; G06N 5/022
  USPC ........................................................ 707/739
  See application file for complete search history.

(56) References Cited

U.S. PATENT DOCUMENTS

| | | | |
|---|---|---|---|
| 2017/0039188 A1* | 2/2017 | Allen | G06F 40/263 |
| 2017/0161619 A1* | 6/2017 | Franceschini | G06N 5/022 |
| 2018/0300312 A1* | 10/2018 | Raiman | G06N 3/08 |
| 2019/0213407 A1* | 7/2019 | Toivanen | G06V 10/945 |
| 2019/0332670 A1* | 10/2019 | Zorzin | G06F 40/30 |
| 2020/0050636 A1* | 2/2020 | Datla | G06F 40/30 |
| 2020/0302015 A1* | 9/2020 | Kannan | G06F 40/284 |

OTHER PUBLICATIONS

Li et al; Article: "a Bag-of-Concepts representation for document classification based on automatic knowledge acquisition from probabilistic knowledge base"; Knowledge-Based Systems, vol. 193, 2020, 105436, ISSN 0950-7051, https://doi.org/10.1016/j.knosys.2019.105436. (Year: 2020).*

CNIPA, Notification of First Office Action for CN202310103329.X, Feb. 6, 2024.

CNIPA, Notification to grant patent right for invention in CN202310103329.X, Feb. 27, 2024.

* cited by examiner

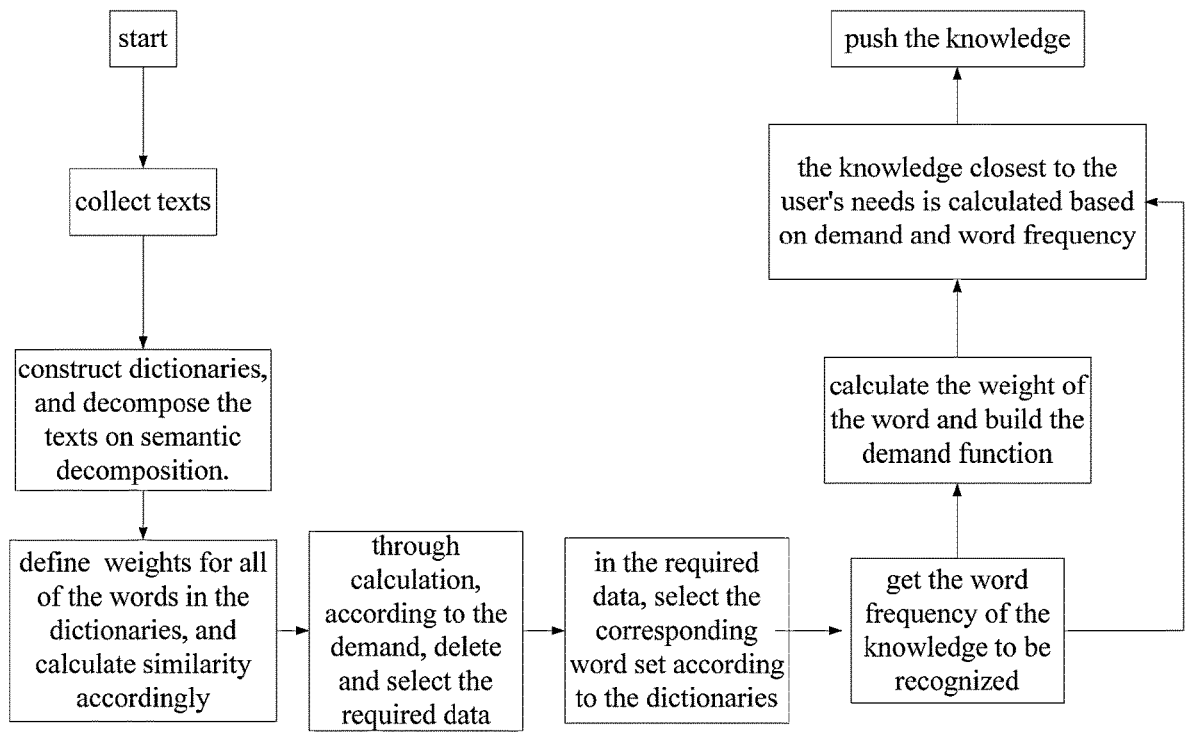

GREEN KNOWLEDGE RECOMMENDATION METHOD BASED ON CHARACTERISTIC SIMILARITY AND USER DEMANDS, ELECTRONIC DEVICE AND COMPUTER READABLE STORAGE MEDIUM THEREOF

FIELD OF THE INVENTION

The present invention relates to green knowledge recommendation methods, and more particularly to a green knowledge recommendation method based on characteristic similarity and user demands, an electronic device and a computer readable storage medium thereof.

BACKGROUND OF THE INVENTION

In the green knowledge base, the traditional way for users to search for the desired knowledge is not accurate and the search time is too slow. Because users in the search process is often very broad but not accurate. The traditional way to respond to a user's search is to give a search result that is only large enough, rather than trying to determine how to reduce uncertainty in the user's broad knowledge. Traditional methods only give a broad range of results and let the user to slowly search for themselves, thereby reducing what is unnecessary knowledge. Such a search method is too slow, and the search results are not accurate enough to meet the needs of users.

SUMMARY OF THE INVENTION

The object of the present invention is to provide a green knowledge recommendation method based on characteristic similarity and user demands to solve the problem that the search results are not accurate enough to meet the needs of users. The green knowledge recommendation method acts as a template-based method and allows users to quickly find what they need, so as to avoid users' meaningless search, improve the search efficiency, and reduce the loss of useless time.

It is adopted by the present invention to realize with the following technical scheme.

A green knowledge recommendation method based on characteristic similarity and user demands includes following steps 1~4.

Step 1, obtain a current-search text e and a historical-search-texts set $E_u$ both from a user u, $E_u=\{e_{1,u}, e_{2,u}, \ldots, e_{n_1,u}, \ldots, e_{N_1,u}\}$. Wherein, the $e_{n_1,u}$ represents the $n_1$th historical-search text, $1 \leq n_1 \leq N_1$; the $N_1$ represents the total number of historical-search texts.

Step 2, construct a topics dictionary and a subtopics dictionary, and decompose the current-search text e and the historical-search-texts set $E_u$ on the basis of semantic decomposition. The step 2 includes steps 2.1~2.6.

Step 2.1, construct a topics dictionary X of a green knowledge base, $X=\{x_1, x_2, \ldots, x_{n_2}, \ldots, x_{N_2}\}$. Wherein the $x_{n_2}$ represents the $n_2$th topics, the $N_2$ represents the total number of topics in the dictionary X.

Construct a subtopics dictionary Y of the green knowledge base, $Y=\{y_1, y_2, \ldots, y_{n_3}, \ldots, y_{N_3}\}$. Wherein the $y_{n_3}$ represents the $n_3$th subtopics, the $N_3$ represents the total number of subtopics in the dictionary Y.

Construct a daily-expressions dictionary C of a set of users, $C=\{c_1, c_2, \ldots, c_{n_4}, \ldots, c_{N_4}\}$. Wherein the $c_{n_4}$ represents the $n_4$th daily expression, the $N_4$ represents the total number of daily expressions in the dictionary C.

Step 2.2, decompose e and $e_{n_1,u}$ according to dictionaries X, Y, C to obtain two text-vector sets $w_e$ and $w_{n_1}$ correspondingly. The $w_e$ is about the current-search text e, $w_e=\{w_1^e, w_2^e, \ldots, w_{i_e}^e, \ldots, w_{I_e}^e\}$. The $w_{n_1}$ is about the $n_1$th historical-search text $e_{n_1,u}$, $$w_{n_1} = \{w_1^{n_1}, w_2^{n_1}, \ldots, W_{i_{n_1}}^{n_1}, \ldots, w_{I_{n_1}}^{n_1}\}.$$

Wherein the $w_{i_e}^e$ represents the $i_e$th word of the current-search text e; the $I_e$ represents the total number of words in the current-search text e; the $$w_{i_{n_1}}^{n_1}$$

represents the ith word of the $n_1$th historical-search text $e_{n_1,u}$; the $I_{n_1}$ represents the total number of words in the $n_1$th historical-search text $e_{n_1,u}$.

Define $t_{i_e}^e$ being the label of the $w_{i_e}^e$. If the $t_{i_e}^e$ belongs to the dictionary X, define $w_{i_e}^e \in X$; if the $t_{i_e}^e$ belongs to the dictionary Y, define $w_{i_e}^e \in Y$; if the $t_{i_e}^e$ belongs to the dictionary C, define $w_{i_e}^e \in C$; otherwise define $w_{i_e}^e \in \emptyset$.

Define $t_i^{n_1}$ being the label of $$w_{i_{n_1}}^{n_1}.$$

If the $t_i^{n_1}$ belongs to the dictionary X, define $$w_{i_{n_1}}^{n_1} \in X;$$

if the $t_i^{n_1}$ belongs to the dictionary Y, define $$w_{i_{n_1}}^{n_1} \in$$

Y; if the $t_i^{n_1}$ belongs to the dictionary C, define $$w_{i_{n_1}}^{n_1} \in C,$$

otherwise define $$w_{i_{n_1}}^{n_1} \in \emptyset.$$

Step 2.3, obtain the weight $L_i^{n_1}$ of the ith word $$w_{i_{n_1}}^{n_1}$$

by the formula (1).

$$L_i^{n_1} = \begin{cases} \delta_1, & \text{if } t_i^{n_1} \in X \\ \delta_2, & \text{if } t_i^{n_1} \in Y \\ 0, & \text{if } t_i^{n_1} \in C \cup \{\emptyset\} \end{cases} \quad (1)$$

In the formula, the $\delta_1$ represents the first weight, the $\delta_2$ represents the second weight, and $0<\delta_2<\delta_1<1$.

Step 2.4, obtain the weight $L_{i_e}^e$ of the $i_e$th word $w_{i_e}^e$ by the same way of step 2.3.

Step 2.5, obtain the similarity $$g\left(w_{i_e}^e, w_{i_{n_1}}^{n_1}\right)$$

between the $w_{i_e}^e$ and the $$w_{i_{n_1}}^{n_1}$$

by the formula (2).

$$g\left(w_{i_e}^e, w_{i_{n_1}}^{n_1}\right) = \frac{\left(\sum_{i_e=1}^{I_e} w_{i_e}^e L_{i_e}^e\right)\left(\sum_{i_{n_1}=1}^{I_{n_1}} w_{i_{n_1}}^{n_1} L_{i_{n_1}}^{n_1}\right)}{\left\|\sum_{i_e=1}^{I_e} w_{i_e}^e L_{i_e}^e\right\|^2 \left\|\sum_{i_{n_1}=1}^{I_{n_1}} w_{i_{n_1}}^{n_1} L_{i_{n_1}}^{n_1}\right\|^2 - \left(\sum_{i_e=1}^{I_e} w_{i_e}^e L_{i_e}^e\right)\left(\sum_{i_{n_1}=1}^{I_{n_1}} w_{i_{n_1}}^{n_1} L_{i_{n_1}}^{n_1}\right)} \quad (2)$$

Step 2.6, obtain the similarities between each of the two words respectively from two text-vector sets $w_e$ and $w_{n1}$ by the same way of step 2.5. Collect words with the highest similarity to be a candidate-words set in which one candidate word would be select to be the $n_1$th word of the $w_e$. A valid-text set $V_{i_e}^e$ is defined by all candidate-words sets, $V_{i_e}^e = \{v_{1,i_e}^e, v_{2,i_e}^e, \ldots, v_{p,i_e}^e, \ldots, v_{P,i_e}^e\}$. Wherein the $v_{P,i_e}^e$ represents the pth candidate word of the $i_e$th word $w_{i_e}^e$, the p represents the total number of candidate words.

Step 3, according to the weight, pick words in the $w_e$ and the $V_{i_e}^e$ that belong to the two dictionaries X and Y. The step 3 includes steps 3.1~3.6.

Step 3.1, pick words in the $w_e$ that belong to the dictionary X.

When $w_{i_e}^e L_{i_e}^{n_1} = \delta_1$, $x_{i_e}^e$ is defined to mean the words corresponding to the $w_{i_e}^e$ and is also from the dictionary X. The first words set is defined by many $x_{i_e}^e$ accordingly, and the $L_{i_e}^{n_1}$ is the weight of the $w_{i_e}^e$.

Step 3.2, pick words in the $V_{i_e}^e$ that belong to the dictionary X.

When $v_{p,i_e}^e L_{p,i_e}^e = \delta_1$, $x_{p,i_e}^e$ is defined to mean the words corresponding to the $v_{p,i_e}^e$ and is also from the dictionary X. The second words set is defined by many $V_{i_e}^e$ accordingly, and the $L_{p,i_e}^e$ is the weight of the $v_{p,i_e}^e$.

Step 3.3, a large-subject terms set Z is defined by the first words set and the second words set, $Z = \{z_1^X, z_2^X, \ldots, x_{n_5}^X, \ldots, z_{N_5}^X\}$.

Wherein the $z_{n_5}^X$ represents the $n_5$th large-subject term, $1 \leq n_5 \leq N_5$, and the $N_5$ represents the total number of large-subject terms.

Step 3.4, pick words in the $w_e$ that belong to the dictionary Y. When $w_{i_e}^e L_i^{n_1} = \delta_1$, $y_{i_e}^e$ is defined to mean the words corresponding to the $w_{i_e}^e$ and is also from the dictionary Y.

Step 3.5, pick words in the $V_{i_e}^e$ that belong to the dictionary Y; when $L_i^{n_1} = \delta_1$, $y_i^{valid}$ is defined to mean the words corresponding to the $V_{i_e}^e$ and is also from the dictionary Y.

Step 3.6, a minor-subject terms set V is defined by the $w_e$ and the $V_{i_e}^e$, $V = \{v_1^Y, v_2^Y, \ldots, v_{n_6}^Y, \ldots, v_{N_6}^Y\}$. Wherein the $v_{n_6}^Y$ represents the $n_6$th minor-subject term, $1 \leq n_6 \leq N_6$, and the $N_6$ represents the total number of minor-subject terms.

Step 4, find the corresponding knowledge according to user satisfaction. The step 4 includes steps 4.1~4.6.

Step 4.1, acquire a knowledge a to be identified, and calculate the frequency of each of the word appearing in the knowledge a after semantic decomposition under the dictionary X and the minor-subject terms set V, $$\left\{s_{x_1}^a, \ldots s_{x_{n_2}}^a, \ldots s_{x_{N_2}}^a, t_{v_1^Y}^a, \ldots, t_{v_{n_6}^Y}^a, \ldots, t_{v_{N_6}^Y}^a\right\}.$$

Wherein the $$s_{x_{n_2}}^a$$

represents the frequency of the $n_2$th topic $x_{n_2}$ appearing in the knowledge a, $$0 \leq s_{x_{n_2}}^a \leq 1;$$

and the $$t_{v_{N_6}^Y}^a$$

represents the frequency of the $n_6$th subtopic $v_{n_6}^Y$ appearing in the knowledge a, $0 \leq$ $$t_{v_{n_6}^Y}^a \leq 1.$$

Step 4.2, assigns a value to each of the word in the minor-subject terms set V, and a weighting function $H(v_{n_6}^Y)$ of words in minor-subject terms set V is defined as formula (3).

$$H\left(v_{n_6}^Y\right) = \frac{v_{n_6}^Y}{\sum_{n_6=1}^{N_6} v_{n_6}^Y} \quad (3)$$

Step 4.3, a user-demand degree function $Q(v_{n_6}^Y)$ is defined as formula (4).

$$Q\left(v_{n_6}^Y\right) = H\left(v_{n_6}^Y\right)k \quad (4)$$

In the formula, the K represents users' satisfaction, $k \in (0, 100\%)$.

Step 4.4, get a topic $x_{user}$ required by the user in the topics dictionary X, and calculate the closing degree $d_1^a$ between the topic $x_{user}$ and the knowledge a, $d_1^a = 1 - s_{x_{user}}^a$. Wherein the $s_{x_{user}}^a$ represents the frequency of the topic $x_{user}$ appearing in the knowledge a.

Step 4.5, get the user's demand for each of the minor-subject term in the minor-subject terms set V, and calculate the user's closing degree $d_2^a$ to all of the minor-subject terms, $$d_2^a = \sum_{n_6=1}^{N_6} \left( Q\left(v_{n_6}^Y\right)^2 - \left(t_{v_{n_6}}^{a_Y}\right)^2 \right).$$

Step 4.6, calculate the closing degree $d^a$ between the user's demand and the knowledge a, $d^a = d_1^a + d_2^a$, obtain all of the closing degree of all of the knowledge, and select some knowledge with less closing degree to fed to the user.

The present invention further provides an electronic device, including a memory and a processor. The memory is used to store programs that could support the processor to execute. Wherein the programs are programmed according to the green knowledge recommendation method.

The present invention further provides a computer readable storage medium, used to store programs that are programmed according to the green knowledge recommendation method.

Compared with the prior art, the beneficial effects of the present invention are as follows.

1. The present invention firstly divides the collected text into words, and also sets the weight to improve the usefulness of similarity calculation. The present invention secondly divides the text into two parts according to the dependency relationship between the user's demand for large type and small type, so that the user's idea is more specific and detailed, and in the demand degree model, the user's demand for different types can be combined to make the search results conform to the user's demand. According to the received knowledge, the word frequency obtained after the dictionaries and the sets, the present invention is compared with the demand function to find out the knowledge that best meets the needs of the user.
2. The present invention uses a similarity model to quickly obtain usable text. The use of demand degree model can make users combine different types of needs, so that the search results meet the needs of users. The present invention combines the demand of the user with the results of previous searches, so that the accuracy of the pushed results is greatly improved.

BRIEF DESCRIPTION OF THE DRAWINGS

FIG. 1 is a flow diagram of the green knowledge recommendation method, according to the embodiment of the present invention.

DETAILED DESCRIPTION OF PREFERRED EMBODIMENTS

Referring to FIG. 1, in the present embodiment, a green knowledge recommendation method based on characteristic similarity and user demands includes following steps.

Step 1, obtain a current-search text e and a historical-search-texts set $E_u$ both from a user u, $E_u = \{e_{1,u}, e_{2,u}, \ldots, e_{n_1,u}, \ldots, e_{N_1,u}\}$. Wherein, the $e_{n_1,u}$ represents the $n_1$th historical-search text, $1 \leq n_1 \leq N_1$; the $N_1$ represents the total number of historical-search texts.

Step 2, construct a topics dictionary and a subtopics dictionary, and decompose the current-search text e and the historical-search-texts set $E_u$ on the basis of semantic decomposition. The step 2 includes steps 2.1~2.6.

Step 2.1, construct a topics dictionary X of a green knowledge base, $X = \{x_1, x_2, \ldots, x_{n_2}, \ldots, x_{N_2}\}$. Wherein the $x_{n_2}$ represents the $n_2$th topics, the $N_2$ represents the total number of topics in the dictionary X. The topics can be cars, machine tools, refrigerators, and other big categories.

Construct a subtopics dictionary Y of the green knowledge base, $Y = \{y_1, y_2, \ldots, y_{n_3}, \ldots, y_{N_3}\}$. Wherein the $y_{n_3}$ represents the $n_3$th subtopics, the $N_3$ represents the total number of subtopics in the dictionary Y. The subtopics can be a small type under a large type such as a large car, bus, truck, or a component such as a chassis, engine, shell, or a lightweight, energy-saving, wear-resistant effect.

Construct a daily-expressions dictionary C of a set of users, $C = \{c_1, c_2, \ldots, c_{n_4}, \ldots, c_{N_4}\}$. Wherein the $c_{n_4}$ represents the $n_4$th daily expression, the $N_4$ represents the total number of daily expressions in the dictionary C. The daily expression can be I, you, he, or whatever, want such everyday words.

Step 2.2, decompose e and $e_{n_1,u}$ according to dictionaries X, Y, C to obtain two text-vector sets $w_e$ and $w_{n_1}$ correspondingly. The $w_e$ is about the current-search text e, $w_e = \{w_1^e, w_2^e, \ldots, w_{i_e}^e, \ldots, w_{I_e}^e\}$. The $w_{n_1}$ is about the $n_1$th historical-search text $e_{n_1,u}$, $$w_{n_1} = \left\{ w_1^{n_1}, w_2^{n_1}, \ldots, w_{i_{n_1}}^{n_1}, \ldots, w_{I_{n_1}}^{n_1} \right\}.$$

Wherein the $w_{i_e}^e$ represents the $i_e$th word of the current-search text e; the $I_e$ represents the total number of words in the current-search text e; the $$w_{i_{n_1}}^{n_1}$$

represents the ith word of the $n_1$th historical-search text $e_{n_1,u}$; the $I_{n_1}$ represents the total number of words in the $n_1$th historical-search text $e_{n_1,u}$. Here is the use of stuttering word segmentation system to carry out semantic decomposition, the use of stuttering word segmentation used the dictionaries X, Y, C. The dictionary to which the participle belongs is replaced by $t_{i_e}^e$ and $t_i^{n_1}$.

Define $t_{i_e}^e$ being the label of the $w_{i_e}^e$. If the $t_{i_e}^e$ belongs to the dictionary X, define $w_{i_e}^e \in X$; if the $t_{i_e}^e$ belongs to the dictionary Y, define $w_{i_e}^e \in Y$; if the $t_{i_e}^e$ belongs to the dictionary C, define $w_{i_e}^e \in C$; otherwise define $w_{i_e}^e \in \emptyset$.

Define $t_i^{n_1}$ being the label of $$w_{i_{n_1}}^{n_1}.$$

If the $t_i^{n_1}$ belongs to the dictionary X, define $$w_{i_{n_1}}^{n_1} \in X;$$

if the $t_i^{n_1}$ belongs to the dictionary Y, define $$w_{i_{n_1}}^{n_1} \in Y;$$

if the $t_i^{n_1}$ belongs to the dictionary C, define $$w_{i_{n_1}}^{n_1} \in C,$$

otherwise define $$w_{i_{n_1}}^{n_1} \in \emptyset.$$

Use labels to detect the dictionary that each word corresponds to, to simplify the identification of the relationship.

Step 2.3, obtain the weight $L_i^{n_1}$ of the ith word $$w_{i_{n_1}}^{n_1}$$

by the formula (1).

$$L_i^{n_1} = \begin{cases} \delta_1, & \text{if } t_i^{n_1} \in X \\ \delta_2, & \text{if } t_i^{n_1} \in Y \\ 0, & \text{if } t_i^{n_1} \in C \cup \{\emptyset\} \end{cases} \quad (1)$$

In the formula, the $\delta_1$ represents the first weight, the $\delta_2$ represents the second weight, and $0<\delta_2<\delta_1<1$. Set weights for words that fall under topics, subtopics, and daily-expressions.

Step 2.4, obtain the weight $L_{i_e}^e$ of the $i_e$th word $w_{i_e}^e$ by the same way of step 2.3.

Step 2.5, obtain the similarity $$g\left(w_{i_e}^e, w_{i_{n_1}}^{n_1}\right)$$

between the $w_{i_e}^e$ and the $$w_{i_{n_1}}^{n_1}$$

by the formula (2).

$$\left(w_{i_e}^e, w_{i_{n_1}}^{n_1}\right) = \frac{\left(\sum_{i_e=1}^{I_e} w_{i_e}^e L_{i_e}^e\right)\left(\sum_{i_{n_1}=1}^{I_{n_1}} w_{i_{n_1}}^{n_1} L_{i_{n_1}}^{n_1}\right)}{\left(\left\|\sum_{i_e=1}^{I_e} w_{i_e}^e L_{i_e}^e\right\|^2 \left\|\sum_{i_{n_1}=1}^{I_{n_1}} w_{i_{n_1}}^{n_1} L_{i_{n_1}}^{n_1}\right\|\right) - \left(\sum_{i_e=1}^{I_e} w_{i_e}^e L_{i_e}^e\right)\left(\sum_{i_{n_1}=1}^{I_{n_1}} w_{i_{n_1}}^{n_1} L_{i_{n_1}}^{n_1}\right)} \quad (2)$$

The text vector set is converted into a numerical vector during the computation.

Step 2.6, obtain the similarities between each of the two words respectively from two text-vector sets $w_e$ and $w_{n1}$ by the same way of step 2.5.

Collect words with the highest similarity to be a candidate-words set in which one candidate word would be select to be the $n_1$th word of the $w_e$.

A valid-text set $V_{i_e}^e$ is defined by all candidate-words sets, $V_{i_e}^e = \{v_{1,i_e}^e, v_{2,i_e}^e, \ldots, v_{p,i_e}^e, \ldots, v_{P,i_e}^e\}$.

Wherein the $v_{P,i_e}^e$ represents the pth candidate word of the $i_e$th word $w_{i_e}^e$, the p represents the total number of candidate words. Choose the text you want based on the similarity you want.

Step 3, according to the weight, pick words in the $w_e$ and the $V_{i_e}^e$ that belong to the two dictionaries X and Y. The step 3 includes steps 3.1~3.6.

Step 3.1, pick words in the $w_e$ that belong to the dictionary X.

When $w_{i_e}^e L_{i_e}^{n_1} = \delta_1$, $x_{i_e}^e$ is defined to mean the words corresponding to the $w_{i_e}^e$ and is also from the dictionary X. The first words set is defined by many $x_{i_e}^e$ accordingly, and the $L_{i_e}^{n_1}$ is the weight of the $w_{i_e}^e$.

Step 3.2, pick words in the $V_{i_e}^e$ that belong to the dictionary X.

When $v_{p,i_e}^e L_{p,i_e}^e = \delta_1$, $x_{p,i_e}^e$ is defined to mean the words corresponding to the $v_{p,i_e}^e$ and is also from the dictionary X. The second words set is defined by many $V_{i_e}^e$ accordingly, and the $L_{p,i_e}^e$ is the weight of the $v_{p,i_e}^e$.

Step 3.3, a large-subject terms set Z is defined by the first words set and the second words set, $Z = \{z_1^X, z_2^X, \ldots, x_{n_5}^X, \ldots, z_{N_5}^X\}$. Wherein the $z_{n_5}^X$ represents the $n_5$th large-subject term, $1 \leq n_5 \leq N_5$, and the $N_5$ represents the total number of large-subject terms. The number of the large-subject terms is set to prepare the text content for the demand for words of a topic and the closeness of knowledge to the topic.

Step 3.4, pick words in the $w_e$ that belong to the dictionary Y. When $w_{i_e}^e L_i^{n_1} = \delta_1$, $y_{i_e}^e$ is defined to mean the words corresponding to the $w_{i_e}^e$ and is also from the dictionary Y.

Step 3.5, pick words in the $V_{i_e}^e$ that belong to the dictionary Y; when $L_i^{n_1} = \delta_1$, $y_{i_e}^{valid}$ is defined to mean the words corresponding to the $V_{i_e}^e$ and is also from the dictionary Y.

Step 3.6, a minor-subject terms set V is defined by the $w_e$ and the $V_{i_e}^e$, $V = \{v_1^Y, v_2^Y, \ldots, v_{n_6}^Y, \ldots, v_{N_6}^Y\}$. Wherein the $v_{n_6}^Y$ represents the $n_6$th minor-subject term, $1 \leq n_6 \leq N_6$, and the $N_6$ represents the total number of minor-subject terms. The number of the minor-subject terms is set to prepare the text content for the demand for words of a subtopic and the closeness of knowledge to the subtopic.

Step 4, find the corresponding knowledge according to user satisfaction. The step 4 includes steps 4.1~4.6.

Step 4.1, acquire a knowledge a to be identified, and calculate the frequency of each of the word appearing in the knowledge a after semantic decomposition under the dictionary X and the minor-subject terms set V, $$\left\{s_{x_1}^a, \ldots s_{x_{n_2}}^a, \ldots s_{x_{N_2}}^a, t_{v_1}^a, \ldots, t_{v_{n_6}}^a, \ldots, t_{v_{N_6}}^a\right\}.$$

Wherein the $$s^a_{x_{n_2}}$$

represents the frequency of the $n_2$th topic $x_{n_2}$ appearing in the knowledge a, $$0 \le s^a_{x_{n_2}} \le 1;$$

and the $$t^a_{v^Y_{n_6}}$$

represents the frequency of the $n_6$th subtopic $v_{n_6}^Y$ appearing in the knowledge a, $0\le$ $$t^a_{v^Y_{n_6}} \le 1.$$

Step 4.2, assigns a value to each of the word in the minor-subject terms set V, and a weighting function $H(v_{n_6}^Y)$ of words in minor-subject terms set V is defined as formula (3). Here, word frequency is used to show the proportion of each feature in the knowledge a, and it is also the influence of each feature in the knowledge a.

$$H(v^Y_{n_6}) = \frac{v^Y_{n_6}}{\sum^{N_6}_{n_6=1} v^Y_{n_6}} \quad (3)$$

Step 4.3, a user-demand degree function $Q(v_{n_6}^Y)$ is defined as formula (4).

$$Q(v^Y_{n_6}) = H(v^Y_{n_6})k \quad (4)$$

In the formula, the K represents users' satisfaction, $k \in (0, 100\%)$.

Because there are some effects in the user's overall text that are more searched, this is obviously what the user wants more.

Step 4.4, get a topic $x_{user}$ required by the user in the topics dictionary X, and calculate the closing degree $d_1^a$ between the topic $x_{user}$ and the knowledge a, $d_1^a = 1 - s_{x_{user}}^a$. Wherein the $s_{x_{user}}^a$ represents the frequency of the topic $x_{user}$ appearing in the knowledge a. Because there is usually only one requirement for a car or airplane, for example, set the header requirement to 1.

Step 4.5, get the user's demand for each of the minor-subject term in the minor-subject terms set V, and calculate the user's closing degree $d_2^a$ to all of the minor-subject terms, $$d^a_2 = \sum^{N_6}_{n_6=1}\left(Q(v^Y_{n_6})^2 - (t^a_{v^Y_{n_6}})^2\right).$$

Because the semantic decomposition uses the minor-subject terms set V, the subscript of $v_{n_6}^Y$ is $n_6$.

Step 4.6, calculate the closing degree $d^a$ between the user's demand and the knowledge a, $d^a = d_1^a + d_2^a$, obtain all of the closing degree of all of the knowledge, and select some knowledge with less closing degree to fed to the user.

The present embodiment further provides an electronic device, including a memory and a processor. The memory is used to store programs that could support the processor to execute. Wherein the programs are programmed according to the green knowledge recommendation method.

The present embodiment further provides a computer readable storage medium, used to store programs that are programmed according to the green knowledge recommendation method.

The invention claimed is:

1. A knowledge recommendation method based on characteristic similarity and user demands, executed by a processor of an electronic device, the method comprises:

step 1, receiving a current-search text e from a user u, and obtaining a historical-search-texts set $E_u$ from the user u, $E_u = \{e_{1,u}, e_{2,u} \ldots, e_{n_1,u}, \ldots, e_{N_1,u}\}$, wherein, the $e_{n_1,u}$ represents the $n_1^{th}$ historical-search text, $1 \le n_1 \le N_1$; the $N_1$ represents a total number of historical-search texts;

step 2, constructing a topics dictionary and a subtopics dictionary, and decomposing the current-search text e and the historical-search-texts set $E_u$ on the basis of decomposition; the topics dictionary is a large type and the subtopics dictionary is a small type under the large type, the step 2 comprising steps 2.1~2.6;

step 2.1, constructing a topics dictionary X of a knowledge base, $X = \{x_1, x_2, \ldots, x_{n2}, \ldots, x_{N2}\}$, wherein the $x_{n2}$ represents the $n_2^{th}$ topics, the $N_2$ represents a total number of topics in the dictionary X;

constructing a subtopics dictionary Y of the knowledge base, $Y = \{y_1, y_2, \ldots, y_{n3}, \ldots, y_{N3}\}$, wherein the $y_{n3}$ represents the $n_3^{th}$ subtopics, the $N_3$ represents a total number of subtopics in the dictionary Y;

constructing a daily-expressions dictionary C of a set of users, $C = \{c_1, c_2, \ldots, c_{n4}, \ldots, c_{N4}\}$, wherein the $c_{n4}$ represents the $n_4^{th}$ daily expression, the $N_4$ represents a total number of daily expressions in the dictionary C, the daily expression comprises everyday words including I, you, he, whatever, and want;

step 2.2, decomposing e and $e_{n1,u}$ according to dictionaries X, Y, C to obtain two text-vector sets $w_e$ and $w_{n1}$ correspondingly; the $w_e$ being about a current-search text e, $w_e = \{w_1^e, w_2^e, \ldots, w_{i_e}^e, \ldots, w_{I_e}^e\}$, the $w_{n1}$ being about the $n_1^{th}$ historical-search text $e_{n1,u}$, $$w_{n_1} = \{w_1^{n_1}, w_2^{n_1}, \ldots, w_{i_{n_1}}^{n_1}, \ldots, w_{I_{n_1}}^{n_1}\};$$

wherein the $w_{i_e}^e$ represents the $i_e^{th}$ word of the current-search text e, the $I_e$ represents a total number of words in the current-search text e, the $w_{i_{n_1}}^{n_1}$ represents the $i^{th}$ word of the $n_1^{th}$ historical-search text $e_{n1,u}$, the $I_{n_1}$ represents a total number of words in the $n_1^{th}$ historical-search text $e_{n1,u}$;

defining $t_{i_e}^e$ being a label of the $w_{i_e}^e$; if the $t_{i_e}^e$ belonging to the dictionary X, defining $w_{i_e}^e \in X$; if the $t_{i_e}^e$ belonging to the dictionary Y, defining $w_{i_e}^e \in Y$; if the $t_{i_e}^e$ belonging to the dictionary C, defining $w_{i_e}^e \in C$; otherwise defining $w_{i_e}^e \in \emptyset$;

defining $t_i^{n_1}$ being a label of $$w_{i_{n_1}}^{n_1};$$

if the $t_i^{n_1}$ belonging to the dictionary X, defining $$w_{i_{n_1}}^{n_1} \in X;$$

if the $t_i^{n_1}$ belonging to the dictionary Y, defining $$w_{i_{n_1}}^{n_1} \in Y;$$

if the $t_i^{n_1}$ belonging to the dictionary C, defining $$w_{i_{n_1}}^{n_1} \in C;$$

otherwise defining $$w_{i_{n_1}}^{n_1} \in \emptyset;$$

step 2.3, obtaining a weight $L_i^{n_1}$ of the $i^{th}$ word $$w_{i_{n_1}}^{n_1}$$

by a formula (1);

$$L_i^{n_1} = \begin{cases} \delta_1, & \text{if } t_i^{n_1} \in X \\ \delta_2, & \text{if } t_i^{n_1} \in Y \\ 0, & \text{if } t_i^{n_1} \in C \cup \{\emptyset\} \end{cases} \quad (1)$$

in the formula, the $\delta_1$ representing a first weight, the $\delta_2$ representing a second weight, and $0 < \delta_2 < \delta_1 < 1$;

step 2.4, obtaining the weight $L_{i_e}^e$ of the $i_e^{th}$ word $w_{i_e}^e$ by the same way of step 2.3;

step 2.5, obtaining a similarity $$g\left(w_{i_e}^e, w_{i_{n_1}}^{n_1}\right)$$

between the $w_{i_e}^e$ and the $$w_{i_{n_1}}^{n_1}$$

by a formula (2);

$$g\left(w_{i_e}^e, w_{i_{n_1}}^{n_1}\right) = \frac{\left(\sum_{i_e=1}^{I_e} w_{i_e}^e L_{i_e}^e\right)\left(\sum_{i_{n_1}=1}^{I_{n_1}} w_{i_{n_1}}^{n_1} L_{i_{n_1}}^{n_1}\right)}{\left\|\sum_{i_e=1}^{I_e} w_{i_e}^e L_{i_e}^e\right\|^2 \left\|\sum_{i_{n_1}=1}^{I_{n_1}} w_{i_{n_1}}^{n_1} L_{i_{n_1}}^{n_1}\right\|^2} - \left(\sum_{i_e=1}^{I_e} w_{i_e}^e L_{i_e}^e\right)\left(\sum_{i_{n_1}=1}^{I_{n_1}} w_{i_{n_1}}^{n_1} L_{i_{n_1}}^{n_1}\right) \quad (2)$$

step 2.6, obtaining the similarities between each of the two words respectively from two text-vector sets $w_e$ and $w_{n_1}$ by the same way of step 2.5, collecting words with the similarity higher than the other words to be a candidate-words set in which one candidate word would be select to be the $n_1^{th}$ word of the $w_e$; a valid-text set $V_{i_e}^e$ being defined by all candidate-words sets, $V_{i_e}^e = \{v_{1,i_e}^e, v_{2,i_e}^e, \ldots, v_{p,i_e}^e, \ldots, v_{P,i_e}^e\}$, wherein the $v_{p,i_e}^e$ represents the $p^{th}$ candidate word of the $i_e^{th}$ word $w_{i_e}^e$, the p represents a total number of candidate words;

step 3, picking words in the $w_e$ and the $V_{i_e}^e$ that belong to the two dictionaries X and Y; the step 3 comprising steps 3.1~3.6;

step 3.1, picking words in the $w_e$ that belong to the dictionary X;

when $w_{i_e}^e L_{i_e}^{n_1} = \delta_1$, $x_{i_e}^e$ defined to mean words corresponding to the $w_{i_e}^e$ and also from the dictionary X, and a first words set defined by $x_{i_e}^e$ accordingly; the $L_{i_e}^{n_1}$ being the weight of $w_{i_e}^e$;

step 3.2, picking words in the $V_{i_e}^e$ that belong to the dictionary X;

when $v_{p,i_e}^e L_{p,i_e}^e = \delta_1$, $x_{p,i_e}^e$ defined to mean words corresponding to the $v_{p,i_e}^e$ and also from the dictionary X, and a second words set is defined by $V_{i_e}^e$ accordingly; the $L_{p,i_e}^e$ being the weight of the $v_{p,i_e}^e$;

step 3.3, a subject terms set Z defined by the first words set and the second words set, $Z = \{z_1^X, z_2^X, \ldots, x_{n_5}^X, \ldots, z_{N_5}^X\}$, wherein the $z_{n_5}^X$ represents the $n_5^{th}$ subject term, $1 \leq n_5 \leq N_5$, and the $N_5$ represents a total number of subject terms;

step 3.4, picking words in the $w_e$ that belong to the dictionary Y; when $w_{i_e}^e L_i^{n_1} = \delta_1$, $y_{i_e}^e$ defined to mean words corresponding to the $w_{i_e}^e$ and also from the dictionary Y;

step 3.5, picking words in the $V_{i_e}^e$ that belong to the dictionary Y; when $L_i^{n_1} = \delta_1$, $y_i^{valid}$ defined to mean words corresponding to the $V_{i_e}^e$ and also from the dictionary Y;

step 3.6, a subject terms set V defined by the $w_e$ and the $V_{i_e}^e$, $V = \{v_1^Y, v_2^Y, \ldots, v_{n_6}^Y, \ldots, v_{N_6}^Y\}$, wherein the $v_{n_6}^Y$ represents the $n_6^{th}$ subject term, $1 \leq n_6 \leq N_6$, and the $N_6$ represents a total number of subject terms;

step 4, finding the knowledge; the step 4 comprising steps 4.1~4.6;

step 4.1, acquiring a knowledge to be identified, and calculating a frequency of each of the word appearing in the knowledge to be identified after decomposition under the dictionary X and the subject terms set V, $$\{s_{x_1}^a, \ldots s_{x_{n_2}}^a, \ldots s_{x_{N_2}}^a, t_{v_1}^a, \ldots, t_{v_{n_6}}^a, \ldots, t_{v_{N_6}}^a\},$$

wherein the $$s_{x_{n_2}}^a$$

represents the frequency of the $n_2^{th}$ topic $x_{n_2}$ appearing in the knowledge to be identified, $$0 \le s_{x_{n_2}}^a \le 1;$$

and the $$t_{v_{n_6}^Y}^a$$

represents the frequency of the $n_6^{th}$ subtopic $v_{n_6}^Y$ appearing in the knowledge to be identified, $0 \le$ $$t_{v_{n_6}^Y}^a \le 1;$$

step 4.2, assigning a value to each of the word in the subject terms set V, and a weighting function $H(v_{n_6}^Y)$ of words in subject terms set V being defined as formula (3), and the value of the word in the subject terms set V is defined as the weighting function;

$$H(v_{n_6}^Y) = \frac{v_{n_6}^Y}{\sum_{n_6=1}^{N_6} v_{n_6}^Y} \tag{3}$$

step 4.3, a user-demand degree function $Q(v_{n_6}^Y)$ being defined as formula (4);

$$Q(v_{n_6}^Y) = H(v_{n_6}^Y)k \tag{4}$$

in the formula, the k representing users' satisfaction, $k \in (0, 100\%)$;

step 4.4, receiving a topic $x_{user}$ required by the user in the topics dictionary X, and calculating a closing degree $d_1^a$ between the topic $x_{user}$ and the knowledge to be identified, $d_1^a = 1 - s_{x_{user}}^a$, wherein the $s_{x_{user}}^a$ represents the frequency of the topic $x_{user}$ appearing in the knowledge to be identified;

step 4.5, calculating a user's demand degree, using user-demand degree function for each of the subject term in the subject terms set V, and calculating the user's closing degree $d_2^a$ to all of the subject terms, $$d_2^a = \sum_{n_6=1}^{N_6} \left( Q(v_{n_6}^Y)^2 - \left(t_{v_{n_6}^Y}^a\right)^2 \right);$$

step 4.6, calculating the closing degree $d^a$ between the user's demand degree and the knowledge to be identified, $d^a = d_1^a + d_2^a$, obtaining all of the closing degree of all of the knowledge, and feeding the user some knowledge with closing degree lower than other knowledge.

2. An electronic device, comprising a memory and a processor, the memory used to store programs that could support the processor to execute, wherein the programs are programmed according to claim 1.

3. A non-transitory computer readable storage medium, used to store programs that are programmed according to claim 1.

\* \* \* \* \*